US009641567B2

(12) United States Patent
Doken et al.

(10) Patent No.: US 9,641,567 B2
(45) Date of Patent: *May 2, 2017

(54) CONTROLLING MEDIA AND INFORMING CONTROLLER STATUS IN COLLABORATIVE SESSIONS

(75) Inventors: Serhad Doken, San Diego, CA (US); Haipeng Jin, Carlsbad, CA (US); Arungundram Chandrasekaran Mahendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

This patent is subject to a terminal disclaimer.

(21) Appl. No.: 12/779,694

(22) Filed: May 13, 2010

(65) Prior Publication Data
US 2010/0312841 A1 Dec. 9, 2010

Related U.S. Application Data

(60) Provisional application No. 61/178,476, filed on May 14, 2009, provisional application No. 61/180,556,
(Continued)

(51) Int. Cl.
*G06F 15/16* (2006.01)
*H04L 29/06* (2006.01)

(52) U.S. Cl.
CPC ...... *H04L 65/4015* (2013.01); *H04L 65/1093* (2013.01)

(58) Field of Classification Search
CPC .................. H04L 65/1093; H04L 65/4015
(Continued)

(56) References Cited

U.S. PATENT DOCUMENTS

2002/0062379 A1* 5/2002 Widegren et al. ............ 709/227
2002/0078233 A1* 6/2002 Biliris et al. .................. 709/238
(Continued)

FOREIGN PATENT DOCUMENTS

CN 101309509 A 11/2008
CN 101370292 A 2/2009
(Continued)

OTHER PUBLICATIONS

3rd Generation Partnership Project; Technical Specification Group Core Network and Terminals; IP Multimedia (IM) Core Network (CN) subsystem IP Multimedia Subsystem (IMS) Service Continuity; Stage 3 (Release 8)3GPP Standard; 3GPP TS 24.237, SRD Generation.
(Continued)

*Primary Examiner* — Hua Fan
(74) *Attorney, Agent, or Firm* — Kristine Ekwueme; Guy Perry

(57) ABSTRACT

A communication system extends IETF Session Initiation Protocol (SIP) signaling used by IMS architecture. As a basic use case, initially a first (UE1) (controller) is in a media session (e.g., audio, video and message session) with a remote UE. To transfer provider of one media component to a controllee UE, the controller UE1 sends a REFER message with a relevant body to trigger the media session operations to a Service Centralization and Continuity Application Server (SCC AS). The SCC AS is able to interpret the contents of the REFER message to perform the media session manipulation on one or multiple UEs (originating UE itself or other UEs). The innovation provides for a REFER message that convey what needs to be done in a separate SIP header carrying target dialog and media line number(s), in a SDP body that REFER carries, or XML body that will be in REFER.

64 Claims, 12 Drawing Sheets

Related U.S. Application Data filed on May 22, 2009, provisional application No. 61/180,537, filed on May 22, 2009.

(58) Field of Classification Search
USPC .......................................................... 709/206
See application file for complete search history.

(56) References Cited

U.S. PATENT DOCUMENTS

| | | | |
|---|---|---|---|
| 2002/0112073 | A1 | 8/2002 | Melampy et al. |
| 2002/0120749 | A1* | 8/2002 | Widegren et al. ............ 709/227 |
| 2003/0023730 | A1* | 1/2003 | Wengrovitz et al. ......... 709/227 |
| 2004/0031058 | A1 | 2/2004 | Reisman |
| 2005/0036492 | A1 | 2/2005 | Hoffmann et al. |
| 2005/0122524 | A1 | 6/2005 | Ibarra et al. |
| 2006/0153352 | A1* | 7/2006 | Schmidt et al. ......... 379/202.01 |
| 2009/0135724 | A1 | 5/2009 | Zhang et al. |
| 2009/0150562 | A1* | 6/2009 | Kim et al. .................... 709/238 |
| 2009/0191873 | A1* | 7/2009 | Siegel et al. ............... 455/435.2 |
| 2009/0210478 | A1* | 8/2009 | Bakker .................. G06F 9/465 |
| | | | 709/202 |
| 2009/0259758 | A1 | 10/2009 | Chen et al. |
| 2009/0286516 | A1* | 11/2009 | Sedlacek et al. .......... 455/414.1 |
| 2009/0313378 | A1* | 12/2009 | Mahdi et al. ................. 709/227 |
| 2010/0064172 | A1* | 3/2010 | George et al. .................. 714/15 |
| 2010/0074223 | A1* | 3/2010 | Mahdi ........................... 370/331 |
| 2010/0074224 | A1* | 3/2010 | Mahdi et al. ................. 370/331 |
| 2010/0077459 | A1* | 3/2010 | Mahdi et al. ...................... 726/4 |
| 2010/0103927 | A1* | 4/2010 | Bakker ......................... 370/352 |
| 2010/0146142 | A1* | 6/2010 | Long et al. ................... 709/231 |
| 2010/0279670 | A1* | 11/2010 | Ghai et al. ................. 455/414.3 |
| 2010/0293222 | A1 | 11/2010 | Pope et al. |
| 2010/0312832 | A1* | 12/2010 | Allen et al. ................... 709/204 |
| 2010/0312834 | A1 | 12/2010 | Doken et al. |
| 2010/0312897 | A1* | 12/2010 | Allen et al. ................... 709/227 |
| 2011/0040836 | A1* | 2/2011 | Allen et al. ................... 709/205 |
| 2011/0040881 | A1* | 2/2011 | Coulas et al. ................ 709/227 |
| 2011/0173434 | A1* | 7/2011 | Buckley et al. .............. 713/150 |
| 2012/0143984 | A1 | 6/2012 | Liu et al. |
| 2012/0177193 | A1* | 7/2012 | Keller et al. ............. 379/211.01 |
| 2013/0013796 | A1* | 1/2013 | Kim et al. .................... 709/228 |

FOREIGN PATENT DOCUMENTS

| | | |
|---|---|---|
| CN | 101394605 A | 3/2009 |
| EP | 2086184 A1 | 8/2009 |
| JP | 2004229270 A | 8/2004 |
| JP | 2006501734 A | 1/2006 |
| WO | WO-2006113116 A1 | 10/2006 |

OTHER PUBLICATIONS

3rd Generation Partnership Project; Technical Specification Group Services and System Aspects; IP Multimedia Subsystem (IMS) service continuity enhancements; Service, policy and interaction; Stage 2 (Release 9) 3GPP Standard; 3GPP TR 23.838, 3rd Generation Partnership Project (3GPP), Mobile Competence Centre ; 650, Route Des Lucioles ; F-06921 Sophia-Antipolis Cedex ; France, No. VI.1.0, Apr. 1, 2009 (Apr. 1, 2009), pp. 1-53, XP050363944.

International Search Report and Written Opinion—PCT/US2010/034989, International Search Authority—European Patent Office—Sep. 9, 2010.

Kutscher Ott Bormann Tzi et al: "Session Description and Capability Negotiation; draft-i etf-mmus i c-sdpng-08.txt" IETF Standard-Working-Draft, Internet Engineering Task Force, IETF, CH, vol. mmusic, No. 8, Feb. 20, 2005 (Feb. 20, 2005), XP015023241 ISSN.

Nokia et al: "Clarify determining the capabilities of an UE to act as Controller/Controllee UE" 3GPP Draft; S2-091958, SRD Generation.

Partnership Project (3GPP), Mobile Competence Centre ; 650, Route Des Lucioles ; F-06921 Sophia-Antipolis Cedex ; France.

Taiwan Search Report—TW099115543—TIPO—Apr. 22, 2013.

\* cited by examiner

CONTROLLING MEDIA AND INFORMING CONTROLLER STATUS IN COLLABORATIVE SESSIONS

CLAIM OF PRIORITY UNDER 35 U.S.C. §119

The present application for patent claims priority to Provisional Application No. 61/178,476 entitled "Method and Apparatus for Controlling Media in Collaborative Sessions" filed May 14, 2009, to Provisional Application No. 61/180,556 entitled "Methods and Apparatus for Informing UE of Controller Status in Collaborative Sessions" filed May 22, 2009, and to Provisional Application No. 61/180,537 entitled "Methods and Apparatus for Maintaining Media and Controllee Information in IMS UIT" filed May 22, 2009, each assigned to the assignee hereof and hereby expressly incorporated by reference herein.

REFERENCE TO CO-PENDING APPLICATIONS FOR PATENT

The present application for patent is related to the following co-pending U.S. patent application "Maintaining Controllee Information in Collaborative Sessions" by Jin Haipeng, et al., having Ser. No. 12/779,682, filed concurrently herewith, assigned to the assignee hereof, and expressly incorporated by reference herein

BACKGROUND

Field

The present disclosure relates to a mobile operating environment, and more particularly, to collaborative sessions for inter-user equipment transfers.

Background

Wireless communication networks are widely deployed to provide communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

IP Multimedia (IM) Core Network (CN) Service Centralization and Continuity (SCC) provides the capability of continuing ongoing communication sessions with multiple media across different access networks or across different user equipments (UEs) under the control of the same subscriber. When the communication session is transferred across different UEs, the session can be a collaborative session with controller and controllee UEs. Generally, there can only be one controller UE, or one controller UE at a time, but several controllee UEs can be in the collaborative session.

Protocols can enable IMS SCC based on the Session Initiation Protocol (SIP) and the Session Description Protocol (SDP) and the protocols of the 3GPP Circuit-Switched (CS) domain. However, challenges remain since it can be necessary for changes to arise in a source UE for providing media, moreover control can be transferred.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for inter-user equipment transfer in a collaborative session. A first user equipment communicates to a remote end during a data packet session. The first user equipment controls a second user equipment for inter-user equipment transfer during a collaborative session by communicating with a network entity. One of the first and second user equipment indicates whether one of the first and second a user equipment supports functionality needed as a controller in an inter-user equipment transfer.

In another aspect, at least one processor is provided for inter-user equipment transfer in a collaborative session. A first module communicates from a first user equipment to a remote end during a data packet session. A second module controls a second user equipment for inter-user equipment transfer during a collaborative session by communicating with a network entity. A third module indicates whether one of the first and second a user equipment supports functionality needed as a controller in an inter-user equipment transfer.

In an additional aspect, a computer program product is provided for inter-user equipment transfer in a collaborative session. A non-transitory computer-readable storage medium comprises sets of codes. A first set of codes causes a computer to communicate from a first user equipment to a remote end during a data packet session. A second set of codes causes the computer to control a second user equipment for inter-user equipment transfer during a collaborative session by communicating with a network entity. A third set of codes causes the computer to indicate whether one of the first and second a user equipment supports functionality needed as a controller in an inter-user equipment transfer.

In another additional aspect, an apparatus is provided for inter-user equipment transfer in a collaborative session. Means are provided for communicating from a first user equipment to a remote end during a data packet session. Means are provided for controlling a second user equipment for inter-user equipment transfer during a collaborative session by communicating with a network entity. Means are provided for indicating whether one of the first and second a user equipment supports functionality needed as a controller in an inter-user equipment transfer.

In a further aspect, an apparatus is provided for inter-user equipment transfer in a collaborative session. A transceiver communicates from a first user equipment to a remote end during a data packet session. A computing platform controls, via the transceiver, a second user equipment for inter-user equipment transfer during a collaborative session by communicating with a network entity, indicates whether one of the first and second a user equipment supports functionality needed as a controller in an inter-user equipment transfer.

In yet another aspect, a method is provided for inter-user equipment transfer in a collaborative session. A network entity remotely facilitates across a network a collaborative session of a first user equipment and a second user equipment with a remote end during a data packet session. The network entity relays signaling from one to the other of the first and second user equipment for controlling inter-user equipment transfer during a collaborative session. The network entity receives an indication from one of the first and second user equipment that supports functionality needed as a controller in an inter-user equipment transfer.

In yet an additional aspect, at least one processor is provided for inter-user equipment transfer in a collaborative session. A first module remotely facilitates across a network a collaborative session of a first user equipment and a second user equipment with a remote end during a data packet session. A second module relays signaling from one to the other of the first and second user equipment for controlling inter-user equipment transfer during a collaborative session. A third module receives an indication from one of the first and second user equipment that supports functionality needed as a controller in an inter-user equipment transfer.

In yet another additional aspect, a computer program product is provided for inter-user equipment transfer in a collaborative session. A non-transitory computer-readable storage medium comprises sets of codes. A first set of codes causes a computer to remotely facilitate across a network a collaborative session of a first user equipment and a second user equipment with a remote end during a data packet session. A second set of codes causes the computer to relay signaling from one to the other of the first and second user equipment for controlling inter-user equipment transfer during a collaborative session. A third set of codes causes the computer to receive an indication from one of the first and second user equipment that supports functionality needed as a controller in an inter-user equipment transfer.

In yet a further aspect, an apparatus is provided for inter-user equipment transfer in a collaborative session. Means is provided for remotely facilitating across a network a collaborative session of a first user equipment and a second user equipment with a remote end during a data packet session. Means are provided for relaying signaling from one to the other of the first and second user equipment for controlling inter-user equipment transfer during a collaborative session. Means are provided for receiving an indication from one of the first and second user equipment that supports functionality needed as a controller in an inter-user equipment transfer.

In yet an additional aspect, an apparatus is provided for inter-user equipment transfer in a collaborative session. A network interface remotely facilitates across a network a collaborative session of a first user equipment and a second user equipment with a remote end during a data packet session and relays signaling from one to the other of the first and second user equipment for controlling inter-user equipment transfer during a collaborative session. A computing platform receives via the network interface an indication from one of the first and second user equipment that supports functionality needed as a controller in an inter-user equipment transfer.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
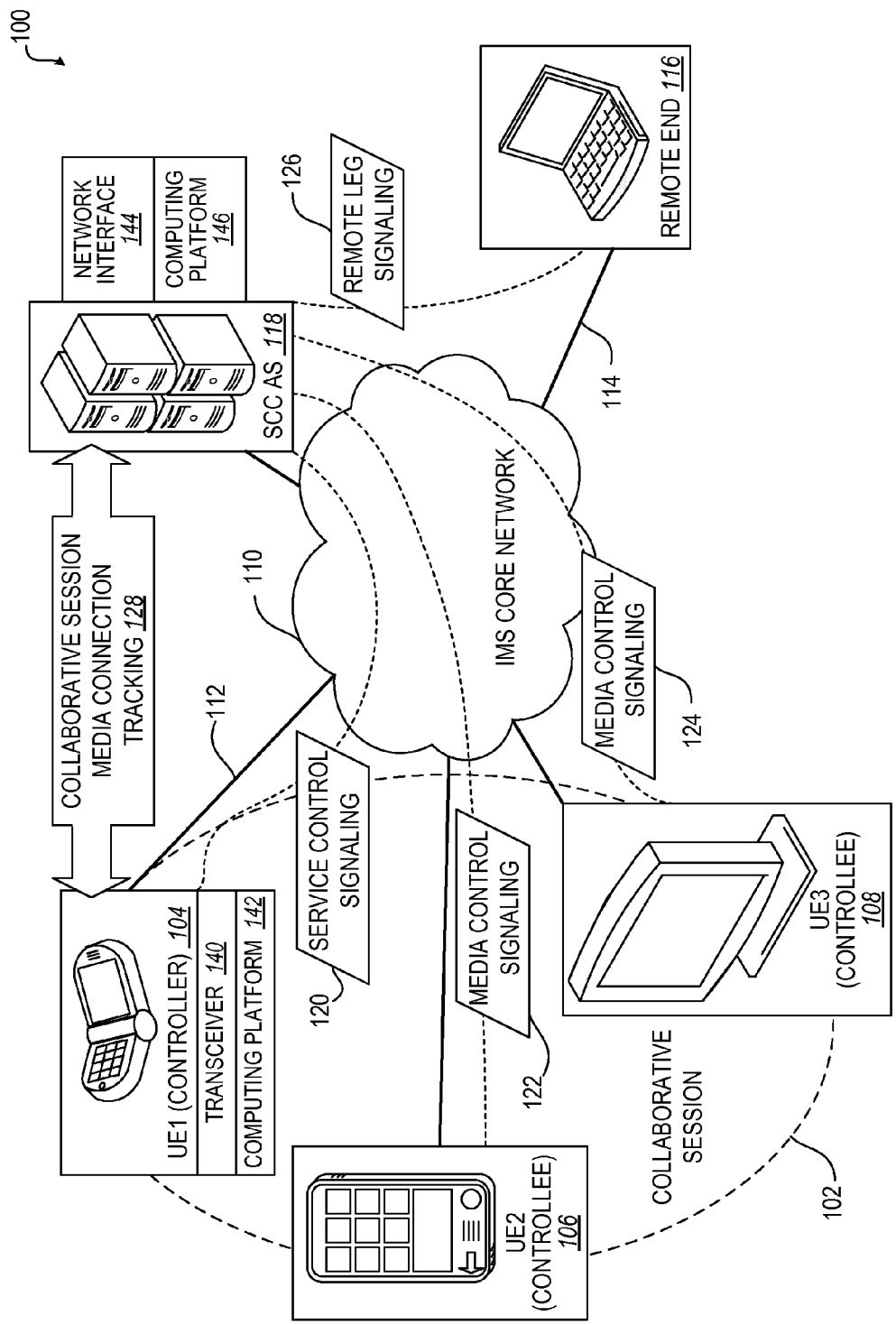
FIG. 1 illustrates a schematic diagram of a communication system in which a collaborative session of user equipment performs inter-user equipment transfer (IUT) while communicating to a remote end via a core network and a network entity.

A communication system extends IETF (Internet Engineering Task Force) SIP (Session Initiation Protocol) signaling used by IMS (IP Multimedia Subsystem) architecture. As a basic use case, initially a first user equipment (UE1) (controller) is in a media session (e.g., audio, video and message session) with a remote UE. To transfer provider or consumer of one media component to a controllee UE, the controller UE1 sends a REFER message with a relevant body to trigger the media session operations to SCC AS. Service Centralization and Continuity Application Server (SCC AS) is able to interpret the contents of the REFER message to perform the media session manipulation on one or multiple UEs (originating UE itself or other UEs). The innovation provides for a REFER message that conveys what needs to be done in a separate SIP header carrying target dialog and media information, in a SDP body that REFER will carry, or XML body that will be in REFER.

In one aspect, in a collaborative session if UE1 transfers media to UE2 and may at the same time also transfers the control of the collaborative session, the present innovation allows a UE to inform the SCC AS whether it is a controller (i.e., supports the procedures needed for IUT controller functionality, e.g., the function sending the SIP message to initiate IUT operation) or a controllee.

In an additional aspect, a user equipment supports functionality needed as a controller in an inter-user equipment transfer. A user equipment can receive from a network entity (e.g., SCC AS) an indication whether to act in a role of the controller or a controllee within the collaborative session. Sending or receiving this indication can be achieved by using a selected one of a group of mechanisms consisting of a Session Initiation Protocol (SIP) media feature tag, a Session Initiation Protocol (SIP) header, and a content body within a Session Initiation Protocol (SIP) message.

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Controlling Media in Collaborative Sessions.

Disclosed examples provide methods and apparatus for user equipment to control media in collaborative sessions. With wide spread use of the Internet and the proliferation of numerous wired and wireless communication devices, individuals and organizations are becoming IP connected. There is a need today, and there will be even greater need in the future, to access any telecommunication (telecom) and data communication (datacom) service, such as voice, video, IM at anytime, anywhere and using any communication device. It is natural to envision that users want to be able to move between devices, to move media streams between devices back and forth, and to manipulate media among devices. Methods and apparatus disclosed herein enable users to perform such varied media operations from their user equipment (UE).

The media operations referred to above include adding, deleting, modifying characteristics (such as changing the codec (coder-decoder), direction, etc.) of a media stream, transferring media sessions, retrieving them back, mixing and duplicating media streams, etc. These operations may be done by a UE on media streams the UE itself, or any UE and multiple UEs provide at one time.

In some scenarios, the focus has been on limited media types, e.g., audio and video only, on a transfer operation, or on a method for collaborating related media sessions. Examples disclosed herein provide the ability to modify multiple media sessions and perform multiple operations all at once. In some disclosed aspects, use of Extensible Markup Language (XML) provides the benefit of being expandable to accommodate further operations/additions that may arise in the future.

Disclosed examples provide use of XML body, Session Initiation Protocol (SIP) header or Session Description Protocol (SDP) body to achieve media session changes, invoking Inter-UE transfer (IUT) to multiple devices at the same time, mechanism to populate the headers to achieve IUT (i.e., Request-URI (Uniform Resource Identifier), Refer-To header, Target-Dialog header, structure of the XML body, etc.). Disclosed examples relate to document entitled "3GPP TS 24.237: IP Multimedia Subsystem (IMS) Service Continuity; Stage 3".

In some examples, the Internet Engineering Task Force (IETF) Session Initiation Protocol (SIP) signaling used by IP multimedia subsystem (IMS) architecture is extended. One example is described with reference to FIG. 1. A communication system 100 is depicted wherein a collaborative session 102 has been established between user equipment (UE), specifically a first UE ("UE1") 104 that acts as a controller, a second UE ("UE2") 106 that acts as a controllee, and a third UE ("UE3") 108 that also acts as a controllee. Each UE 104, 106, 108 is connected to an IMS Core Network (CN) 110 via a respective local leg 112 for signaling and potentially media transfer ultimately to a remote leg 114 to a remote end 116. The collaborative session 102 appears as originated from one signaling UE to the remote end 116 due to the operation of a Service Centralization and Continuity (SCC) Application Server (AS) 118 that is also coupled to the IMS CN 110. Control of the inter-UE transfer (IUT) is accomplished by service control signaling 120 between the UE1 104 and the SCC AS 118, media control signaling 122 between the UE2 106 and the SCC AS 118, media control signaling 124 between the UE3 108 and the SCC AS 118, and remote leg signaling 126 between the remote end 116 and the SCC AS 118. The communication system 100 performs collaborative session media connection tracking 128.

In one aspect, an apparatus such as the UE1 104 acts as controller for IUT in the collaborative session 102. A transceiver 140 of the UE1 104 communicates to a remote end 116 during a data packet session. A computing platform 142 of the UE1 104 controls, via the transceiver 140, the UE2 106 for IUT the collaborative session 102 by communicating with a network entity, depicted as the SCC AS 118. The computing platform 142 determines a change in a media operation for the collaborative session 102 and maintains media components information about the collaborative session 102 updated for the change in the media operation.

In another aspect, an apparatus is depicted as the SCC AS 118 for inter-user equipment transfer in a collaborative session. Its network interface 144 remotely facilitates across a network, depicted as the IMS CN 110, the collaborative session 102 of UE1 104, UE2 106, and UE3 108 with the remote end 116 during a data packet session for UE. The network interface 144 receives a change in a media operation for the collaborative session 102. A computing platform 146 of the SCC AS 118 maintains media components information about the collaborative session 102 updated for the change in the media operation.

Figure 2:
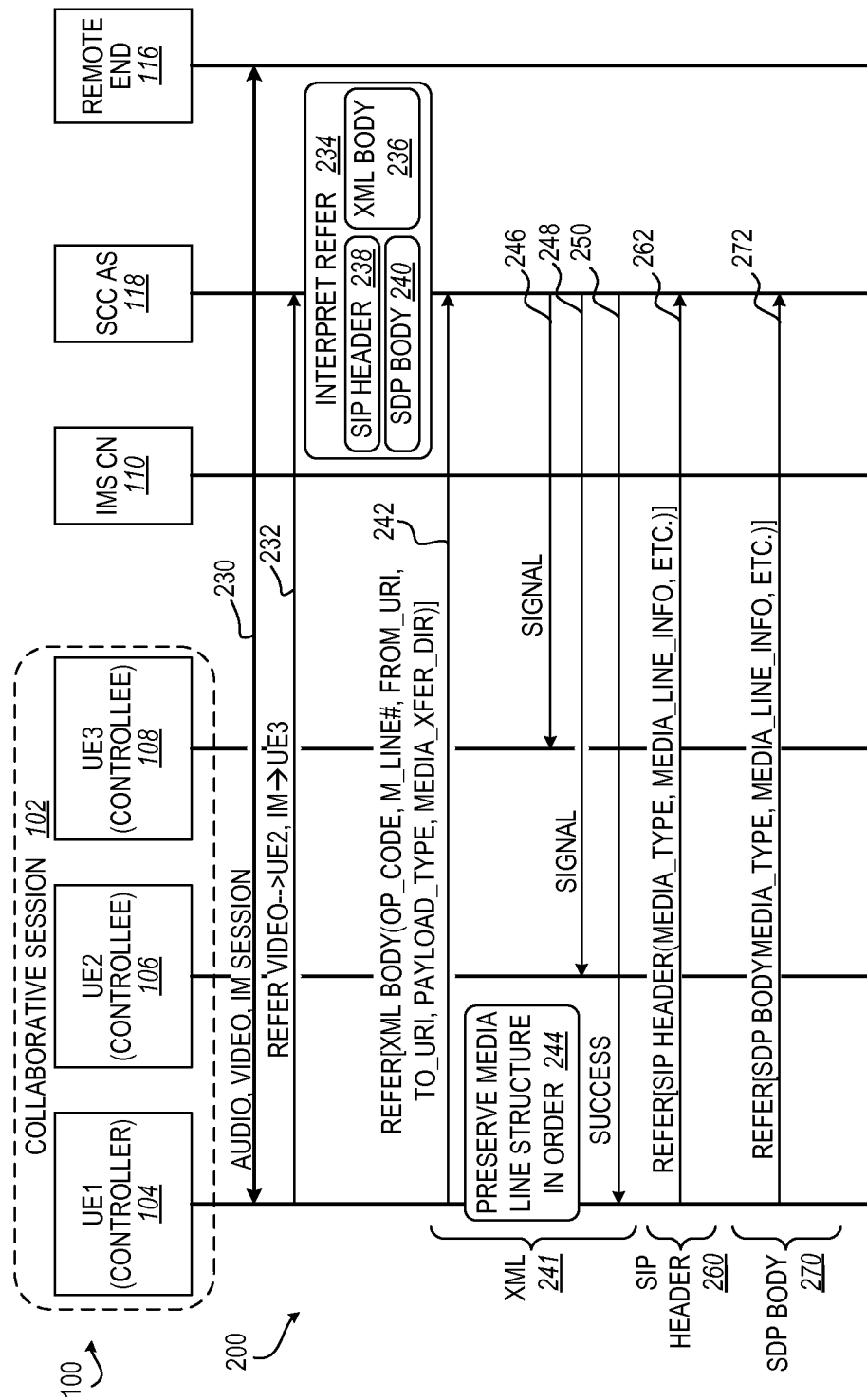
FIG. 2 illustrates a timing diagram for tracking media connections for IUT during a collaborative session.

In FIG. 2, a methodology or sequence of operations 200 are depicted for tracking media connections for IUT during a collaborative session. Initially as depicted at 230, the UE1 (controller) 104 is in an audio, video and Instant Messenger (IM) session with the remote UE (remote end) 116. UE1 104 later transfers the video part of the media session to UE2 (controllee), IM part of the session to UE3, and still keeps the control. To that end, UE1 104 sends a REFER message, depicted at 232, with a relevant body or relevant SIP header to trigger the media session operations to SCC AS. SCC AS is able to interpret the contents of the REFER message to perform the media session manipulation on one or multiple UEs (originating UE1 104 itself or other UEs 106, 108) (block 234). There are several alternatives for the REFER message to convey what needs to be done as part of the IUT operation. These alternatives include (a) XML body that will be in REFER (block 236), (b) in a separate SIP headers carrying target dialog and media information (block 238), or (c) in a SDP body that REFER will carry (block 240).

In one example depicted at 241, the UE's REFER message Request Uniform Resource Identifier (URI) is directed to SCC AS. It has a Refer-To header pointing to the URI of the target UE. The REFER message, using the Target-Dialog header, tells the SCC AS the dialog of the collaborative session whose media or control needs to be modified.

The REFER message contains an XML body to convey information on what type of operations are performed (block 242). The XML body, in an atomic basic media operation element, comprises:

```
<media_operation>
    <operation>op_code</operation>
    <media>m_type</media>
    <media_line>m_line number</media_line>
    <From_uri>source Uri</from_uri>
    <To_uri>target Uri</To_Uri>
    Other elements
</media_operation>
```

Where

The op_code specifies the type of operation is performed, such add, delete, modify, transfer, duplicate, and mix.

The m_type indicates the type of the media which can take value as specified in RFC4566: audio, video, text, application, and message.

The m_line_number indicates the media line number of the media stream that is being operated on.

The source URI indicates the source device of the operation if the operation involves two devices.

The target URI indicates the target device of the operation.

There may also be other elements included to specify more details for the operation include payload type, and media transfer directions. The SCC AS 118 signals to the UE2 as depicted at 246 and to the UE3 as depicted at 248.

An example XML body may comprise:

```
REFER <SCC AS>
.....
Refer-To : Ue2@SccAs
.....
Target-Dialog : Ue1_SccAs_CallId
<Collaborative_Session>
  <media_operation>
    <operation>add</operation>
    <media>audio</media>
    <To_Uri>Ue2@SccAs</To_Uri>
    <media_line>1</media_line>
  </media_operation>
  <media_operation>
    <operation>delete</operation>
    <media>audio</media>
    <To_Uri>Ue3@SccAs</To_Uri>
    <media_line>1</media_line>
  </media_operation>
  <media_operation>
    <operation>modify</operation>
    <media>audio</media>
    <To_Uri>Ue4@SccAs</To_Uri>
    <media_line>1</media_line>
    <payload>H264</payload>
    <direction>recvonly</direction>
  </media_operation>
  <media_operation>
    <operation>transfer</operation>
    <media>audio</media>
    <From_Uri>Ue5@SccAs</From_Uri>
    <To_Uri>Ue1@SccAs</To_Uri>
    <media_line>1</media_line>
  </media_operation>
  <media_operation>
    <operation>retrieve</operation>
    <media>audio</media>
    <To_Uri>Ue3@SccAs</To_Uri>
    <media_line>1</media_line>
  </media_operation>
  <media_operation>
    <operation>duplicate</operation>
    <media>audio</media>
    <To_Uri>Ue1@SccAs</To_Uri>
    <media_line>1</media_line>
  </media_operation>
  <media_operation>
    <operation>mix</operation>
    <media>audio</media>
    <To_Uri>Ue1@SccAs</To_Uri>
    <media_ine>1</media_line>
  </media_operation>
</Operation>
<keep_session_control>no</keep_session_control>
<session_control_target_uri> Ue2@Scc_As
</session_control_target_uri>
</Collaborative_Session>
```

In order to keep track of the media sessions for further similar media operations, controller UE1 104 preserves the media line structure in order (block 244). If the controller UE1 104 is keeping track of all the media streams within the SDP body of its dialog with the SCC AS, then media line numbers specified in this XML body represents the media line order from the controller UE1 point of view. If not, the media line number can take the form UEx:#y where UEx specifies the URI of the UE where the media stream is on and #y specifies the cardinal number of the media on that particular UE. It may be possible to signal all operations that the UE1 104 wants to do in terms of media sessions in one shot to the SCC AS 118. SCC AS 118 may signal the success and failure of these operations in separate notifications back as depicted at 250. In this example, it is possible to modify multiple media components and perform multiple operations at once. Moreover, using XML has the benefit of being accommodative for expansion for further operations/additions that may come in the future.

In another example depicted at 260, if the purpose is to do a simple media transfer initiated by the controller UE1 104 to another UE 106, 108, this may be accomplished with a SIP header in the REFER message indicating the specific media component that is desired to be transferred, the media line information, and other relation information, depicted at 262. Alternatively, the information may also be presented as header parameters within existing SIP headers such as Refer-To header or Target-Dialog SIP header.

The following illustrates one example where the IUT operation information is carried in a SIP header:

```
REFER <SCC AS>
.....
Refer-To : Ue2@SccAs
.....
Target-Dialog : Ue1_SccAs_CallId
IUT:video;2
```

The following illustrates one example where the IUT operation information is carried as part of the header/URI parameters:

```
REFER <SCC AS>
.....
Refer-To :
Ue2@SccAs?body=m%3Daudio%200%20RTP%2FAVP-
%2097%0Dm%3Dvideo%204568%20RTP%2FAVP%2098%0Dm-
%3Dmessage%200%20MSRP%2FTCP%20%2A
.....
Target-Dialog : Ue1_SccAs_CallId
```

In yet another example as depicted 270, the same information may be conveyed within a SDP body that may be carried within REFER with new attributes that identify the operation, source and target URI, for the media lines that targeted for operation, as depicted at 272:

```
REFER <SCC AS>
.....
Refer-To : Ue2@SccAs
.....
Target-Dialog : Ue1_SccAs_CallId
m=video 49170 RTP/AVP 99
a=rtpmap:99 H264/90000
a=fmtp:99 profile-level-id=42A01E; packetization-mode=1;
a=media_operation:add
a=xfer_source_uri:UE1@Scc_As
a=xfer_taget_uri:UE2@Scc_As
```

Informing UE of Controller Status in Collaborative Sessions.

With wide spread use of the Internet and the proliferation of numerous wired and wireless communication devices, individuals and organizations are becoming hyper connected. There is a need today, and there will be even greater need in the future, to access any telecom and datacom service, such as voice, video, IM at anytime, anywhere and using any communication device.

Disclosed examples provide methods and apparatus for informing user equipment (UE) about the controller status in collaborative sessions, in particular whether a UE supports the procedures needed for IUT controller functionality, e.g., the function sending the SIP message to initiate IUT operation; the method also allows the UE to learn whether it is assigned the role of the controller within a collaborative session or not. Disclosed examples relate to document entitled "3GPP TS 24.237: IP Multimedia Subsystem (IMS) Service Continuity; Stage 3," hereby incorporated by reference herein.

Figure 3:
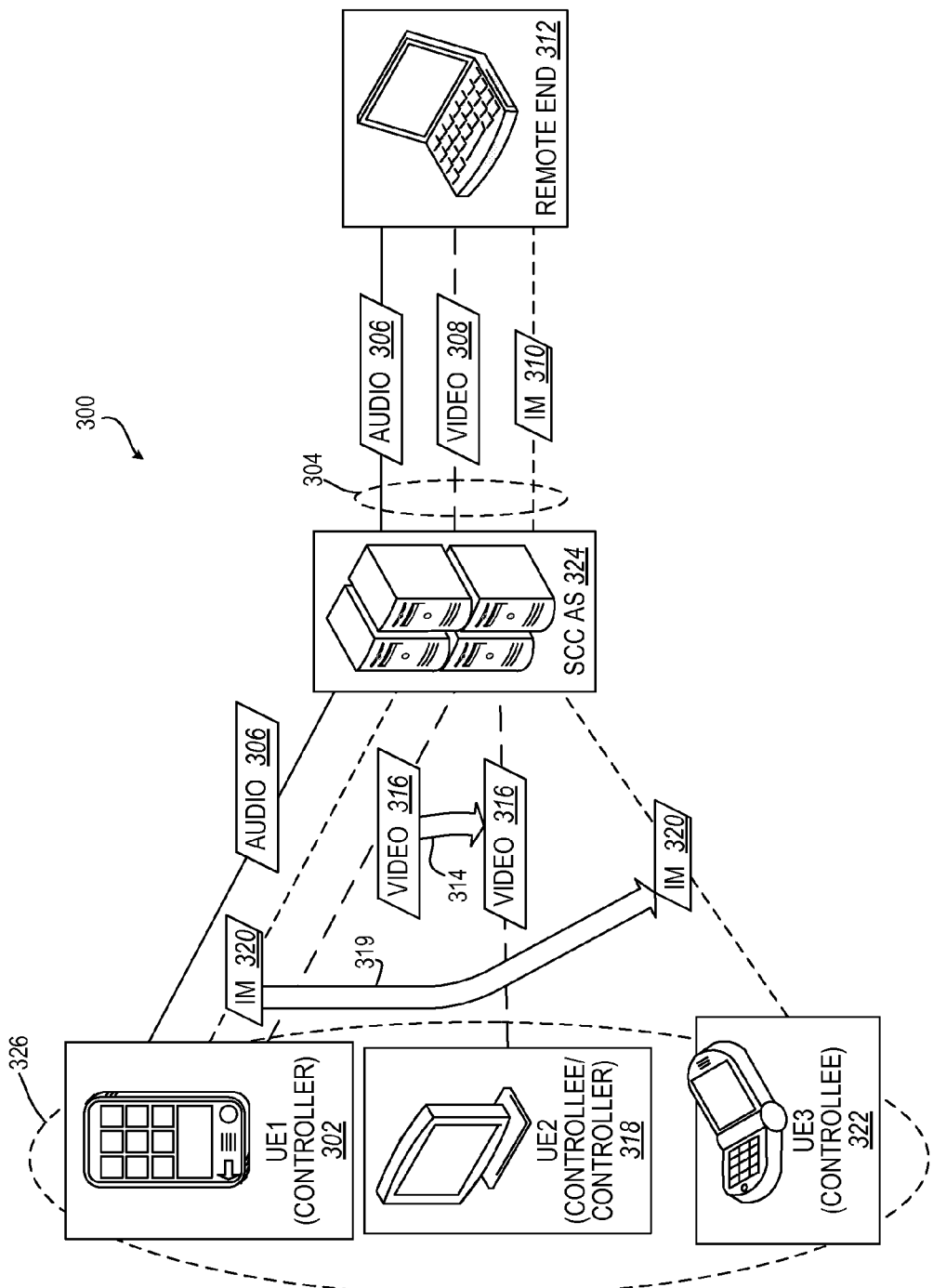
FIG. 3 illustrates a schematic diagram of a communication system in which media components in a media session are transferred between User Equipment (UE) in a collaborative session.

FIG. 3 illustrates an aspect of disclosed examples. Referring to FIG. 3, in one example of a communication system 300, initially UE1 (controller) 302 is in a media session 304 (e.g., a video teleconference) comprised of an audio part 306, video part 308 and an IM part 310 with a remote UE 312. As depicted at 314, UE1 302 later transfers a source video part 316 of the media session 304 to a UE2 (controllee) 318. At 319, the UE1 302 transfers a source IM part 320 of the media session 304 to a UE3 322, and keeps control of the media session 304. If UE1 were to transfer the session control to a UE, e.g., UE2 318 while transferring the video, there is a need for a SCC AS 324 to inform UE2 318 that now it is the controller of this collaborative session 326.

In some examples, it is provided, extending IETF SIP signaling used by IMS architecture to tell the media transfer target whether it is a controller or a controllee UE.

SCC AS within the INVITE message going out to the media transfer target (UE2 in this case) includes a feature tag or a new SIP header or a new content body informing that it is now the controller (or a controllee) of this collaborative session. Similar tag/header may be included within the INVITE or other SIP messages coming back to UE1 informing whether it is a controller/controllee (UE that triggered the IUT operation) when SCC AS is re-directing its media streams. Similar tag/header may be included within the INVITE or other SIP messages coming from UE1 to indicate whether it supports the function of a controller or not.

Some examples are below:

Using a new SIP header controller. A value of yes means that this UE is a controller.

```
INVITE sip:7000 at 10.91.16.7:5060 SIP/2.0
Call-ID: b98d50b3d8a72c46f973097ed52ff81c at 10.91.16.82
CSeq: 1 INVITE
From: "Test" <sip:6020 at 10.91.16.7>;tag=12345
To: "7000" <sip:7000 at 10.91.16.7>
Via: SIP/2.0/UDP 10.91.16.82:5060;branch=
  z9hG4bK461edf96ee970e3c1cbfaa0b58b86634
Max-Forwards: 70
CollaborativeSession-Controller : yes
Contact: "6020" <sip:6020 at 10.91.16.82:5060>
Content-Type: application/sdp
© Defining a new content type
```

In the example below, a new content-type of application/collaborative_session_iut is defined. In the same INVITE that a UE is being directed to media, within the multipart MIME body where SDP is included, with this new content-type, the information of whether the UE is controller or not is conveyed. A value of 'yes' means UE is controller and 'no' means it is a controllee. Alternatively this content type can be used standalone in other SIP message bodies such as OPTIONS, PUBLISH etc. This information may also be part of another event package, XML schema so that it can be sent to the UE via a NTFY using implicit or explicit subscription.

```
INVITE sip:7000 at 10.91.16.7:5060 SIP/2.0
Call-ID: b98d50b3d8a72c46f973097ed52ff81c at 10.91.16.82
CSeq: 1 INVITE
From: "Test" <sip:6020 at 10.91.16.7>;tag=12345
To: "7000" <sip:7000 at 10.91.16.7>
Via: SIP/2.0/UDP 10.91.16.82:5060;branch=
  z9hG4bK461edf96ee970e3c1cbfaa0b58b86634
Max-Forwards: 70
Contact: "6020" <sip:6020 at 10.91.16.82:5060>
Content-Type: multipart/mixed;boundary="theboundary"
.........
.........
--theboundary
Content-Type: application/collaborative_session_iut+xml
<Collaborative_Session>
<controller> yes</controller>
</Collaborative_Session>
--the boundary
Content-Type: application/sdp
v=0
o=- 95 1 IN IP4 192.168.45.194
s=-
t=0 0
m=audio 5234 RTP/AVP 0 8
c=IN IP4 192.168.45.197
a=ptime:20
a=maxptime:20
a=sendrecv
```

Figure 4:
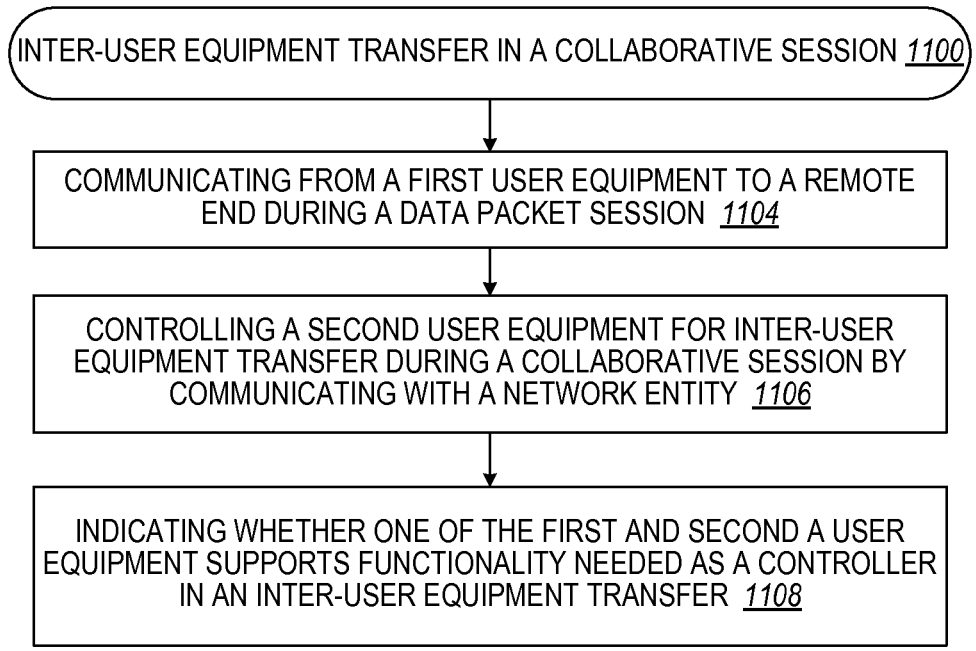
FIG. 4 illustrates a flow diagram for a methodology for user equipment to perform IUT for a collaborative session.

In FIG. 4, a methodology 1100 is depicted for IUT in a collaborative session. A first user equipment communicates to a remote end during a data packet session (block 1104). The first user equipment controls a second user equipment for IUT during a collaborative session by communicating with a network entity (block 1106). One of the first and second user equipment indicate whether one of the first and second a user equipment supports functionality needed as a controller in an inter-user equipment transfer (block 1108).

Figure 5:
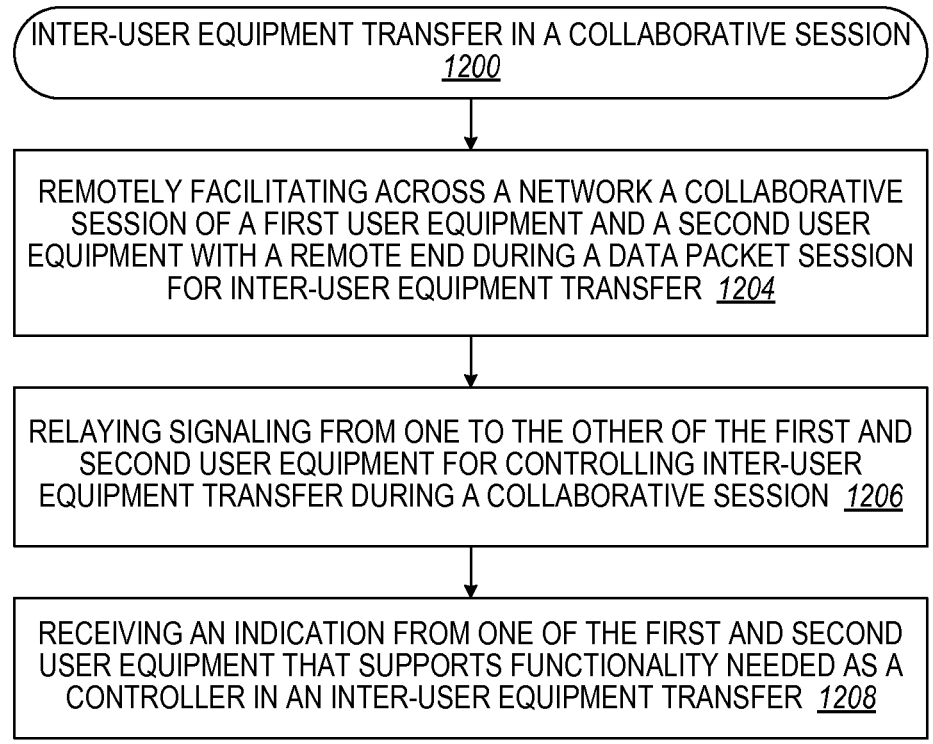
FIG. 5 illustrates a flow diagram for a methodology for a network to perform IUT for a collaborative session.

In FIG. 5, methodology 1200 is depicted for inter-user equipment transfer in a collaborative session. A network entity remotely facilitates across a network a collaborative session of a first user equipment and a second user equipment with a remote end during a data packet session for IUT (block 1204). The network entity relays signaling from one to the other of the first and second user equipment for controlling inter-user equipment transfer during a collaborative session (block 1206). The network entity receives an indication from one of the first and second user equipment that supports functionality needed as a controller in an inter-user equipment transfer (block 1208).

Figure 6:
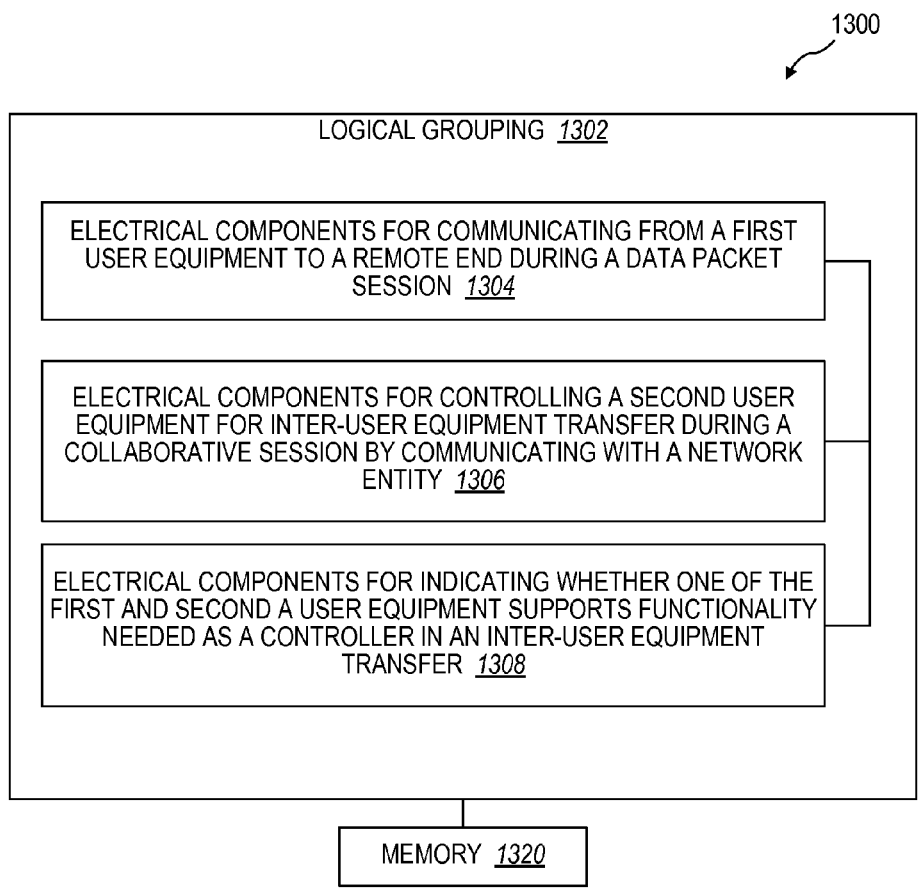
FIG. 6 illustrates a block diagram of a logical grouping of electrical components for IUT for a collaborative session that is incorporated at least in part in user equipment.

With reference to FIG. 6, illustrated is a system 1300 for inter-user equipment transfer in a collaborative session. For example, system 1300 can reside at least partially within user equipment (UE). It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for communicating from a first user equipment to a remote end during a data packet session 1304. Moreover, logical grouping 1302 can include an electrical component for controlling a second user equipment for inter-user equipment transfer during a collaborative session by communicating with a network entity 1306. For another instance, logical grouping 1302 can include an electrical component for indicating whether one of the first and second a user equipment supports functionality needed as a controller in an inter-user equipment transfer 1308. Additionally, system 1300 can include a memory 1320 that retains instructions for executing functions associated with electrical components 1304-1308. While shown as being external to memory 1320, it is to be understood that one or more of electrical components 1304-1308 can exist within memory 1320.

Figure 7:
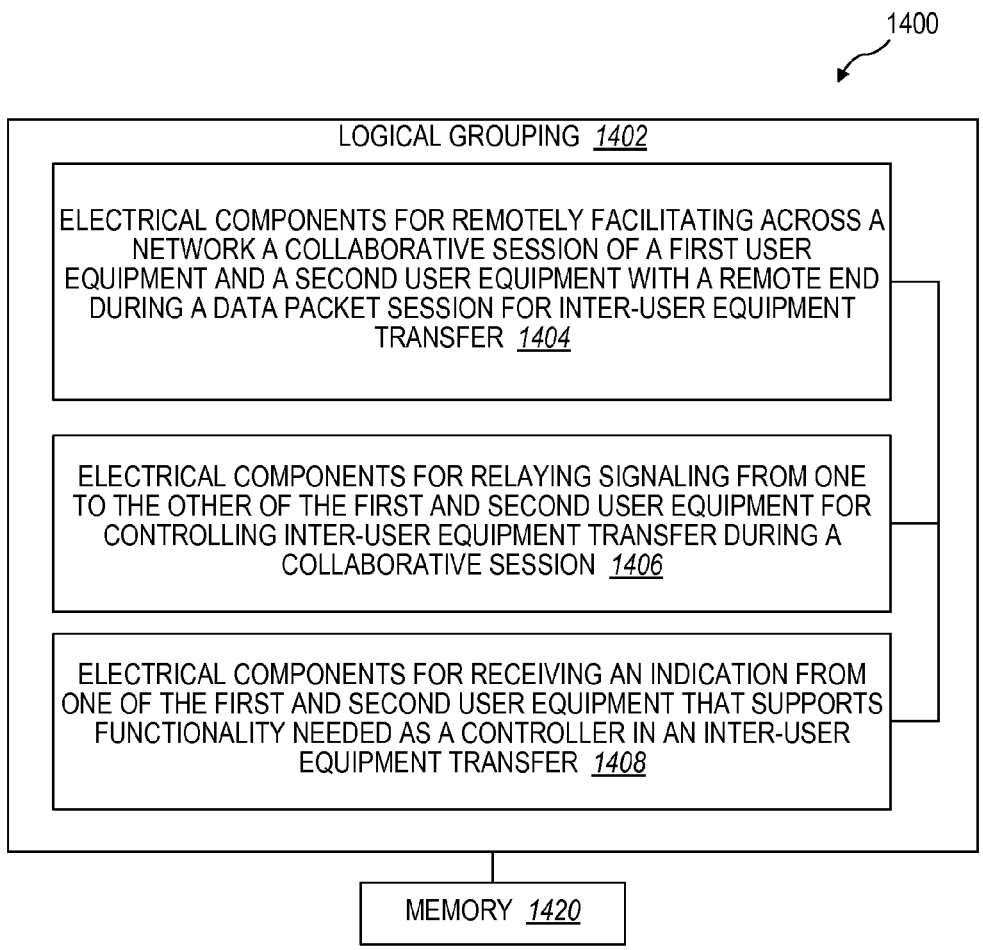
FIG. 7 illustrates a block diagram of a logical grouping of electrical components for IUT for a collaborative session that is incorporated at least in part in a node.

With reference to FIG. 7, illustrated is a system 1400 for inter-user equipment transfer in a collaborative session. For example, system 1400 can reside at least partially within a network entity (e.g., application server). It is to be appreciated that system 1400 is represented as including functional blocks, which can be functional blocks that represent functions implemented by a computing platform, processor, software, or combination thereof (e.g., firmware). System 1400 includes a logical grouping 1402 of electrical components that can act in conjunction. For instance, logical grouping 1402 can include an electrical component for remotely facilitating across a network a collaborative session of a first user equipment and a second user equipment with a remote end during a data packet session for inter-user equipment transfer 1404. Moreover, logical grouping 1402 can include an electrical component for relaying signaling from one to the other of the first and second user equipment for controlling inter-user equipment transfer during a collaborative session 1406. In addition, logical grouping 1402 can include an electrical component for receiving an indication from one of the first and second user equipment that supports functionality needed as a controller in an inter-user equipment transfer 1408. Additionally, system 1400 can include a memory 1420 that retains instructions for executing functions associated with electrical components 1404-1408. While shown as being external to memory 1420, it is to be understood that one or more of electrical components 1404-1408 can exist within memory 1420.

Figure 8:
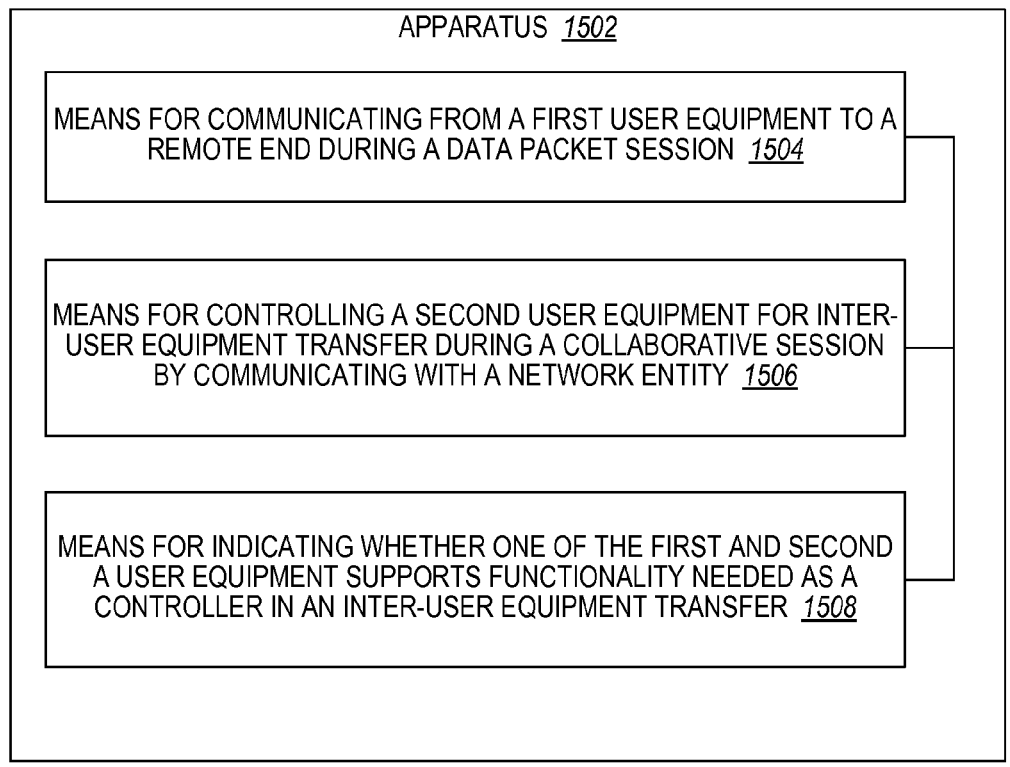
FIG. 8 illustrates a block diagram of an apparatus having means for IUT for a collaborative session by user equipment.

In FIG. 8, an apparatus 1502 is depicted for inter-user equipment transfer in a collaborative session. Means 1504 are provided for communicating from a first user equipment to a remote end during a data packet session. Means 1506 are provided for controlling a second user equipment for inter-user equipment transfer during a collaborative session by communicating with a network entity. Means 1508 are provided for indicating whether one of the first and second a user equipment supports functionality needed as a controller in an inter-user equipment transfer.

Figure 9:
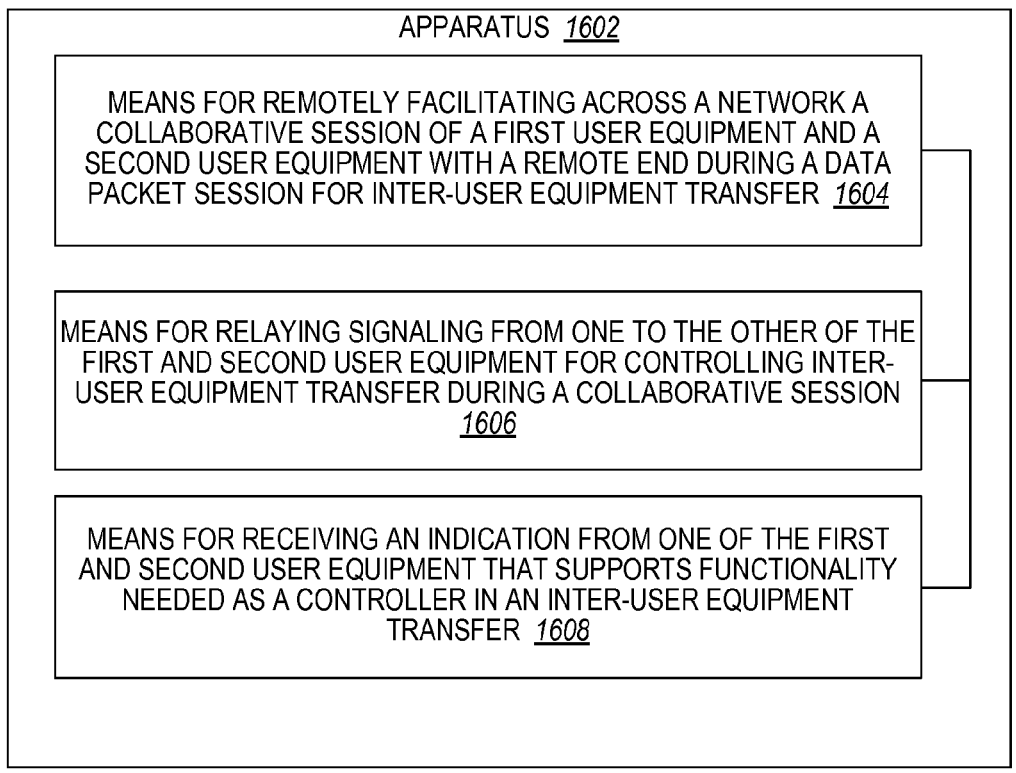
FIG. 9 illustrates a block diagram of an apparatus having means for IUT for a collaborative session by a network entity.

In FIG. 9, an apparatus 1602 is depicted for inter-user equipment transfer in a collaborative session. Means 1604 are provided for remotely facilitating across a network a collaborative session of a first user equipment and a second user equipment with a remote end during a data packet session for inter-user equipment transfer. Means 1606 are provided for relaying signaling from one to the other of the first and second user equipment for controlling inter-user equipment transfer during a collaborative session. Means 1608 are provided for receiving an indication from one of the first and second user equipment that supports functionality needed as a controller in an inter-user equipment transfer.

Figure 10:
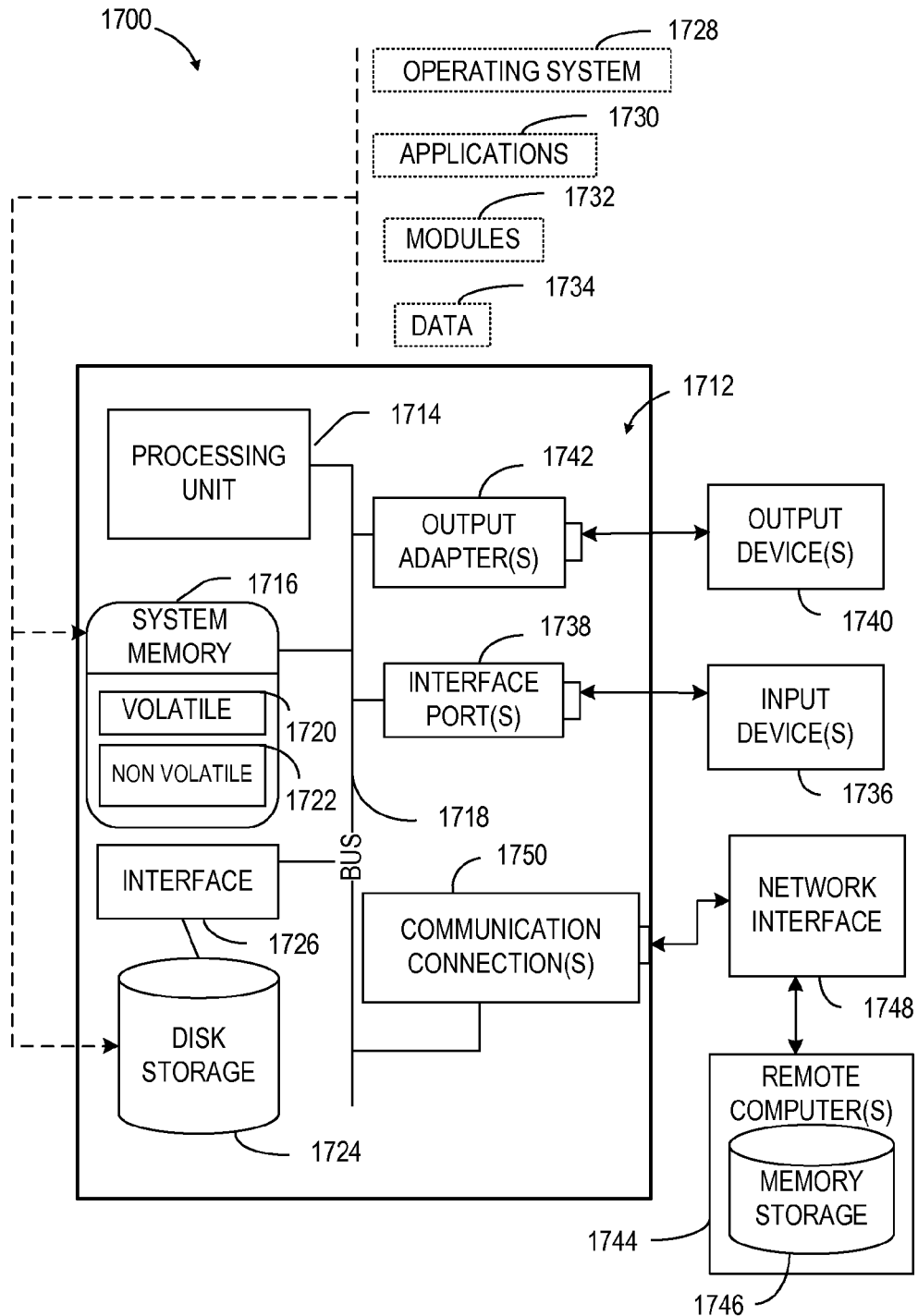
FIG. 10 illustrates a diagram of an exemplary computing environment.

With reference to FIG. 10, an exemplary computing environment 1700 for implementing various aspects of the claimed subject matter includes a computer 1712. The computer 1712 includes a processing unit 1714, a system memory 1716, and a system bus 1718. The system bus 1718 couples system components including, but not limited to, the system memory 1716 to the processing unit 1714. The processing unit 1714 can be any of various available processors. Dual microprocessors and other multiprocessor architectures also can be employed as the processing unit 1714.

The system bus 1718 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1794), and Small Computer Systems Interface (SCSI).

The system memory 1716 includes volatile memory 1720 and nonvolatile memory 1722. The basic input/output system (BIOS), containing the basic routines to transfer information between elements within the computer 1712, such as during start-up, is stored in nonvolatile memory 1722. By way of illustration, and not limitation, nonvolatile memory 1722 can include read only memory (ROM), programmable ROM (PROM), electrically programmable ROM (EPROM), electrically erasable programmable ROM (EEPROM), or flash memory. Volatile memory 1720 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1712 also includes removable/non-removable, volatile/non-volatile computer storage media. FIG. 10 illustrates, for example, disk storage 1724. Disk storage 1724 includes, but is not limited to, devices like a magnetic disk drive, floppy disk drive, tape drive, Jaz drive, Zip drive, LS-100 drive, flash memory card, or memory stick. In addition, disk storage 1724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1724 to the system bus 1718, a removable or non-removable interface is typically used such as interface 1726.

It is to be appreciated that FIG. 10 describes software that acts as an intermediary between users and the basic computer resources described in the suitable operating environment 1700. Such software includes an operating system 1728. Operating system 1728, which can be stored on disk storage 1724, acts to control and allocate resources of the computer system 1712. System applications 1730 take advantage of the management of resources by operating system 1728 through program modules 1732 and program data 1734 stored either in system memory 1716 or on disk storage 1724. It is to be appreciated that the claimed subject matter can be implemented with various operating systems or combinations of operating systems.

A user enters commands or information into the computer 1712 through input device(s) 1736. Input devices 1736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1714 through the system bus 1718 via interface port(s) 1738. Interface port(s) 1738 include, for example, a serial port, a parallel port, a game port, and a universal serial bus (USB). Output device(s) 1740 use some of the same type of ports as input device(s) 1736. Thus, for example, a USB port may be used to provide input to computer 1712 and to output information from computer 1712 to an output device 1740. Output adapter 1742 is provided to illustrate that there are some output devices 1740 like monitors, speakers, and printers, among other output devices 1740, which require special adapters. The output adapters 1742 include, by way of illustration and not limitation, video and sound cards that provide a means of connection between the output device 1740 and the system bus 1718. It should be noted that other devices and/or systems of devices provide both input and output capabilities such as remote computer(s) 1744.

Computer 1712 can operate in a networked environment using logical connections to one or more remote computers, such as remote computer(s) 1744. The remote computer(s) 1744 can be a personal computer, a server, a router, a network PC, a workstation, a microprocessor based appliance, a peer device or other common network node and the like, and typically includes many or all of the elements described relative to computer 1712. For purposes of brevity, only a memory storage device 1746 is illustrated with remote computer(s) 1744. Remote computer(s) 1744 is logically connected to computer 1712 through a network interface 1748 and then physically connected via communication connection 1750. Network interface 1748 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1750 refers to the hardware/software employed to connect the network interface 1748 to the bus 1718. While communication connection 1750 is shown for illustrative clarity inside computer 1712, it can also be external to computer 1712. The hardware/software necessary for connection to the network interface 1748 includes, for exemplary purposes only, internal and external technologies such as, modems including regular telephone grade modems, cable modems and DSL modems, ISDN adapters, and Ethernet cards.

Figure 11:
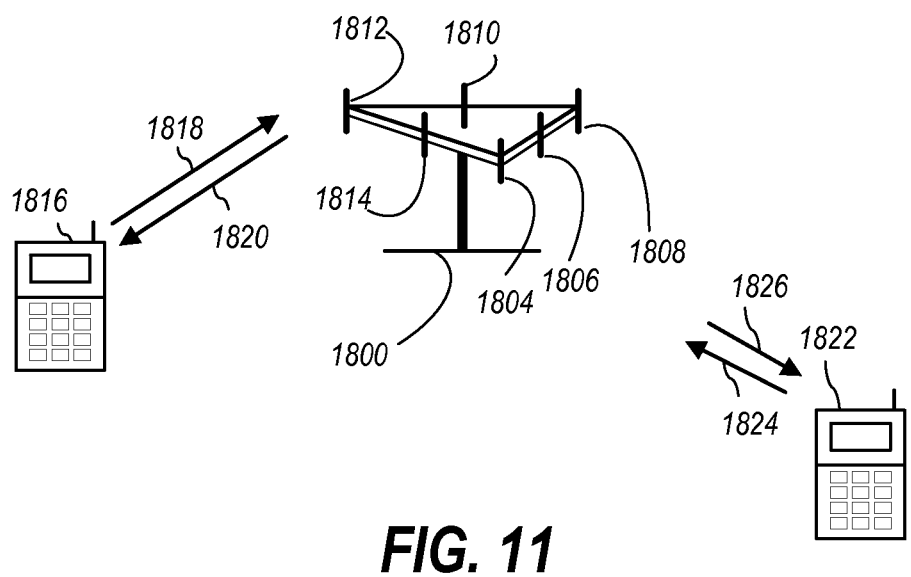
FIG. 11 illustrates a diagram of a multiple access wireless communication system.

Referring to FIG. 11, a multiple access wireless communication system according to one aspect is illustrated. An access point (AP) 1800 includes multiple antenna groups, one including 1804 and 1806, another including 1808 and 1810, and an additional including 1812 and 1814. In FIG. 16, only two antennas are shown for each antenna group, however, more or fewer antennas may be utilized for each antenna group. Access terminal (AT) 1816 is in communication with antennas 1812 and 1814, where antennas 1812 and 1814 transmit information to access terminal 1816 over forward link 1820 and receive information from access terminal 1816 over reverse link 1818. Access terminal 1822 is in communication with antennas 1806 and 1808, where antennas 1806 and 1808 transmit information to access terminal 1822 over forward link 1826 and receive information from access terminal 1822 over reverse link 1824. In a FDD system, communication links 1818, 1820, 1824 and 1826 may use different frequencies for communication. For example, forward link 1820 may use a different frequency then that used by reverse link 1818.

Each group of antennas and/or the area in which they are designed to communicate is often referred to as a sector of the access point. In the aspect, antenna groups each are designed to communicate to access terminals in a sector, of the areas covered by access point 1800.

In communication over forward links 1820 and 1826, the transmitting antennas of access point 1800 utilize beamforming in order to improve the signal-to-noise ratio of forward links for the different access terminals 1816 and 1822. Also, an access point using beamforming to transmit to access terminals scattered randomly through its coverage causes less interference to access terminals in neighboring cells than an access point transmitting through a single antenna to all of its access terminals.

An access point may be a fixed station used for communicating with the terminals and may also be referred to as an access point, a Node B, or some other terminology. An access terminal may also be called user equipment (UE), a wireless communication device, terminal, or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
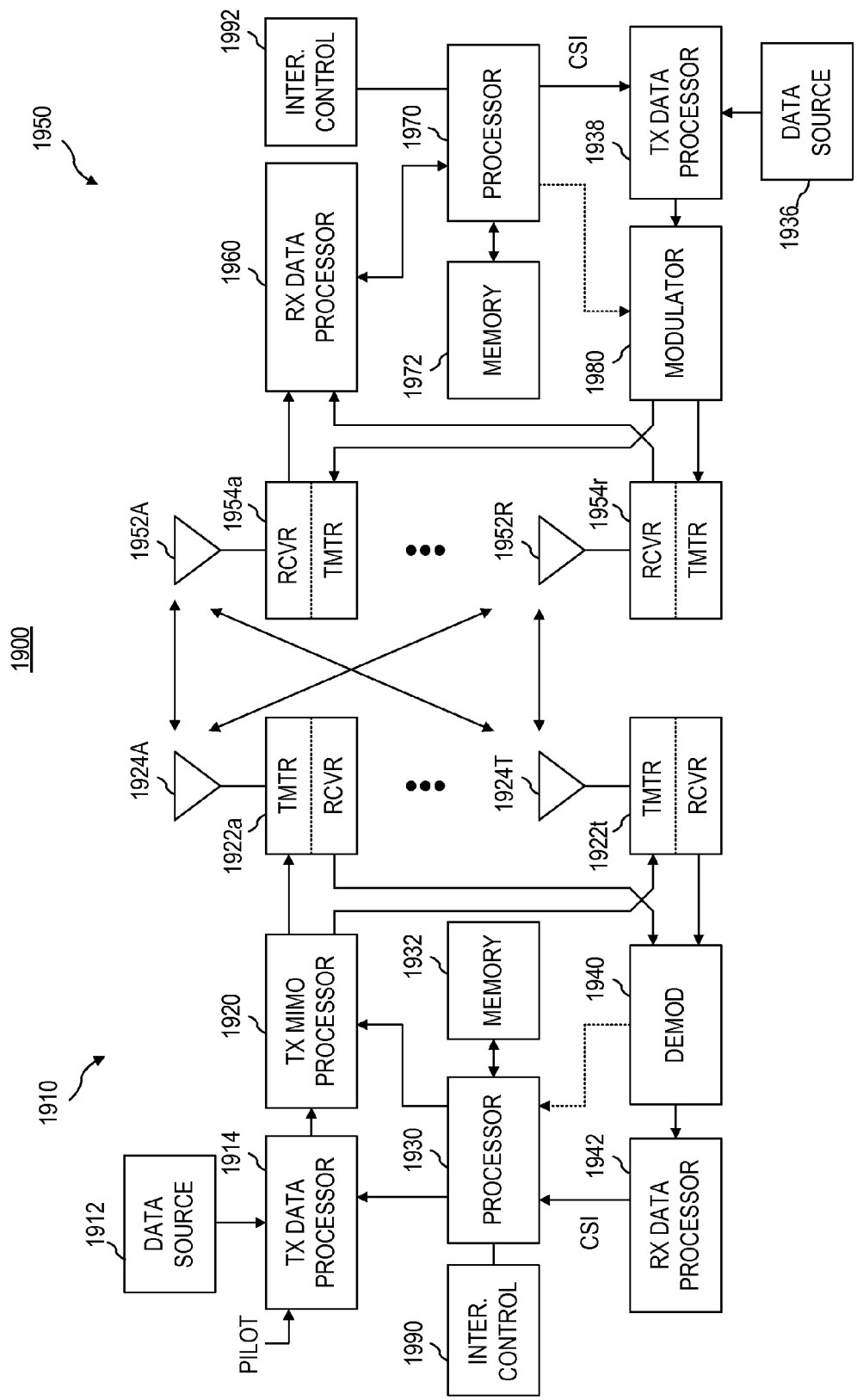
FIG. 12 illustrates a schematic of a multiple input multiple output (MIMO) communication system.

The teachings herein may be incorporated into a node (e.g., a device) employing various components for communicating with at least one other node. FIG. 12 depicts several sample components that may be employed to facilitate communication between nodes. Specifically, FIG. 12 illustrates a wireless device 1910 (e.g., an access point) and a wireless device 1950 (e.g., an access terminal) of a MIMO system 1900. At the device 1910, traffic data for a number of data streams is provided from a data source 1912 to a transmit ("TX") data processor 1914.

In some aspects, each data stream is transmitted over a respective transmit antenna. The TX data processor 1914 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1930. A data memory 1932 may store program code, data, and other information used by the processor 1930 or other components of the device 1910.

The modulation symbols for all data streams are then provided to a TX MIMO processor 1920, which may further process the modulation symbols (e.g., for OFDM). The TX MIMO processor 1920 then provides $N_T$ modulation symbol streams to $N_T$ transceivers ("XCVR") 1922a through 1922t that each has a transmitter (TMTR) and receiver (RCVR). In some aspects, the TX MIMO processor 1920 applies beamforming weights to the symbols of the data streams and to the antenna from which the symbol is being transmitted.

Each transceiver 1922a-1922t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1922a through 1922t are then transmitted from $N_T$ antennas 1924a through 1924t, respectively.

At the device 1950, the transmitted modulated signals are received by $N_R$ antennas 1952a through 1952r and the received signal from each antenna 1952a-1952r is provided to a respective transceiver ("XCVR") 1954a through 1954r. Each transceiver 1954a-1954r conditions (e.g., filters, amplifies, and downconverts) a respective received signal, digitizes the conditioned signal to provide samples, and further processes the samples to provide a corresponding "received" symbol stream.

A receive ("RX") data processor 1960 then receives and processes the $N_R$ received symbol streams from $N_R$ transceivers 1954a-1954r based on a particular receiver processing technique to provide $N_T$ "detected" symbol streams. The RX data processor 1960 then demodulates, deinterleaves, and decodes each detected symbol stream to recover the traffic data for the data stream. The processing by the RX data processor 1960 is complementary to that performed by the TX MIMO processor 1920 and the TX data processor 1914 at the device 1910.

A processor 1970 periodically determines which precoding matrix to use. The processor 1970 formulates a reverse link message comprising a matrix index portion and a rank value portion. A data memory 1972 may store program code, data, and other information used by the processor 1970 or other components of the device 1950.

The reverse link message may comprise various types of information regarding the communication link and/or the received data stream. The reverse link message is then processed by a TX data processor 1938, which also receives traffic data for a number of data streams from a data source 1936, modulated by a modulator 1980, conditioned by the transceivers 1954a through 1954r, and transmitted back to the device 1910.

At the device 1910, the modulated signals from the device 1950 are received by the antennas 1924a-1924t, conditioned by the transceivers 1922a-1922t, demodulated by a demodulator ("DEMOD") 1940, and processed by a RX data processor 1942 to extract the reverse link message transmitted by the device 1950. The processor 1930 then determines which pre-coding matrix to use for determining the beamforming weights then processes the extracted message.

FIG. 12 also illustrates that the communication components may include one or more components that perform interference control operations. For example, an interference ("INTER.") control component 1990 may cooperate with the processor 1930 and/or other components of the device 1910 to send/receive signals to/from another device (e.g., device 1950). Similarly, an interference control component 1992 may cooperate with the processor 1970 and/or other components of the device 1950 to send/receive signals to/from another device (e.g., device 1910). It should be appreciated that for each device 1910 and 1950 the functionality of two or more of the described components may be provided by a single component. For example, a single processing component may provide the functionality of the interference control component 1990 and the processor 1930 and a single processing component may provide the functionality of the interference control component 1992 and the processor 1970.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

What is claimed is:

1. A method for an inter-user equipment (UE) transfer in a collaborative session between at least a first UE and a remote end, comprising:
   communicating from the first UE, via a network entity, to the remote end using a Session Initiation Protocol (SIP) during the collaborative session;
   controlling a second UE during the collaborative session to communicate, via the network entity, with the remote end in the collaborative session, wherein controlling the second UE is based at least in part on initiating, using an enhanced SIP, the inter-UE transfer to transfer at least one media operation of the collaborative session with the remote end to the second UE; and
   indicating, using at least a SIP media feature tag of a SIP message from the network entity to the second UE, wherein the SIP message is related to the inter-UE transfer, whether one of the first UE or the second UE supports functionality as a controller in the inter-UE transfer, wherein the functionality includes sending SIP messages to initiate inter-UE transfer operations.

2. The method of claim 1, wherein indicating whether one of the first UE and the second UE supports functionality as the controller in the inter-UE transfer further comprises:

communicating to the network entity whether a controller function is supported for the inter-UE transfer by the one of the first UE and the second UE; and receiving an indication from the network entity whether the one of the first UE or the second UE is to act in a role of the controller or a controllee within the collaborative session.

3. The method of claim 1, wherein indicating whether one of the first UE and the second UE supports functionality as the controller in the inter-UE transfer further comprises using one of a SIP header, and a content body of the SIP message.

4. The method of claim 2, wherein receiving the indication from the network entity whether the one of the first UE and the second UE is to act in the role of the controller or the controllee within the collaborative session further comprises detecting a selected one of a group of mechanisms including the SIP media feature tag, a SIP header, and a content body within at least one of the SIP messages.

5. The method of claim 1, wherein controlling of the second UE for the inter-UE transfer further comprises indicating information in a transfer request comprising a transfer operation to be performed, a media component type and a media component identification of the at least one media operation, and a source and target device of the transfer operation.

6. The method of claim 1, further comprising determining a change in the at least one media operation of the collaborative session by determining a selected one of a group including adding, deleting, and modifying characteristics of a media stream, transferring a media session, retrieving back a media session, mixing media streams, and duplicating media streams.

7. The method of claim 1, wherein controlling the second UE for the inter-UE transfer during the collaborative session further comprises communicating with a Service Centralization and Continuity (SCC) application server.

8. The method of claim 1, further comprising communicating a change in the at least one media operation of the collaborative session by using an Extensible Markup Language (XML) message.

9. The method of claim 8, wherein communicating the change using the XML message further comprises transferring control of the collaborative session to the second UE.

10. The method of claim 8, further comprising using a Multipurpose Internet Mail Extensions (MIME) type defined for simple media transfer in the collaborative session.

11. The method of claim 8, further comprising using the XML message contained in at least one of the SIP messages to perform media operations.

12. The method of claim 1, further comprising communicating a change in the at least one media operation using signaling contained in a SIP header of a REFER message.

13. The method of claim 1, further comprising communicating an inter-UE transfer media operation using signaling contained in a Session Description Protocol (SDP) representation either in a SIP message body or in a SIP message header.

14. The method of claim 1, further comprising tracking a media direction attribute.

15. The method of claim 1, further comprising indicating that a bi-directional media component that comprises a plurality of unidirectional media components respectively terminated at different UEs.

16. At least one processor for an inter-user equipment (UE) transfer in a collaborative session between at least a first UE and a remote end, comprising:

a first processor module for communicating from the first UE, via a network entity, to the remote end using a Session Initiation Protocol (SIP) during the collaborative session;

a second processor module, comprising hardware, for controlling a second UE during the collaborative session to communicate, via the network entity, with the remote end in the collaborative session, wherein controlling the second UE is based at least in part on initiating, using an enhanced SIP, the inter-UE transfer to transfer at least one media operation of the collaborative session with the remote end to the second UE; and a third processor module for indicating, using at least a SIP media feature tag of a SIP message from the network entity to the second UE, wherein the SIP message is related to the inter-UE transfer, whether one of the first UE or the second UE supports functionality as a controller in the inter-UE transfer, wherein the functionality includes sending SIP messages to initiate inter-UE transfer operations.

17. A non-transitory computer-readable storage medium comprising computer executable codes for an inter-user equipment (UE) transfer in a collaborative session between at least a first UE and a remote end, the codes comprising:

a first set of codes for causing a computer to communicate from the first UE, via a network entity, to the remote end using a Session Initiation Protocol (SIP) during the collaborative session;

a second set of codes for causing the computer to control a second UE during the collaborative session to communicate, via the network entity, with the remote end in the collaborative session, wherein controlling the second UE is based at least in part on initiating, using an enhanced SIP, the inter-UE transfer to transfer at least one media operation of the collaborative session with the remote end to the second UE; and a third set of codes for causing the computer to indicate, using at least a SIP media feature tag of a SIP message from the network entity to the second UE, wherein the SIP message is related to the inter-UE transfer, whether one of the first UE or the second UE supports functionality as a controller in the inter-UE transfer, wherein the functionality includes sending SIP messages to initiate inter-UE transfer operations.

18. An apparatus for an inter-user equipment (UE) transfer in a collaborative session between at least a first UE and a remote end, comprising:

a transceiver for communicating from the first UE, via a network entity, to the remote end using a Session Initiation Protocol (SIP) during the collaborative session; and a computing platform for:
controlling, via the transceiver, a second UE during the collaborative session to communicate, via the network entity, with the remote end in the collaborative session, wherein controlling the second UE is based at least in part on initiating, using an enhanced SIP, the inter-UE transfer to transfer at least one media operation of the collaborative session with the remote end to the second UE; and indicating, using at least a SIP media feature tag of a SIP message from the network entity to the second UE, wherein the SIP message is related to the inter- UE transfer, whether one of the first UE or the second UE supports functionality as a controller in the inter-UE transfer, wherein the functionality includes sending SIP messages to initiate inter-UE transfer operations.

19. The apparatus of claim 18, wherein the computing platform, via the transceiver, is further for indicating whether a controller function is supported for the inter-UE transfer by the one of the first UE and the second UE; and the transceiver is further for receiving an indication from the network entity whether the one of the first UE and the second UE is to act in a role of the controller or a controllee within the collaborative session.

20. The apparatus of claim 18, wherein the computing platform, via the transceiver, is further for indicating whether one of the first UE and the second UE supports functionality as the controller in the inter-UE transfer by using one of a SIP header, and a content body within the SIP message.

21. The apparatus of claim 19, wherein the transceiver is further for receiving an indication from the network entity whether the one of the first UE and the second UE is to act in the role of the controller or the controllee within the collaborative session by detecting a selected one of a group of mechanisms including the SIP media feature tag, a SIP header, and a content body within at least one of the SIP messages.

22. The apparatus of claim 18, wherein the transceiver is further for controlling of the second UE for the inter-UE transfer by indicating information in a transfer request comprising a transfer operation to be performed, a media component type and a media component identification of the at least one media operation, and a source and target device of the transfer operation.

23. The apparatus of claim 18, wherein the computing platform, via the transceiver, is further for determining a change in the at least one media operation of the collaborative session by determining a selected one of a group including adding, deleting, and modifying characteristics of a media stream, transferring a media session, retrieving back a media session, mixing media streams, and duplicating media streams.

24. The apparatus of claim 18, wherein the computing platform, via the transceiver, is further for controlling the second UE for the inter-UE transfer during the collaborative session by communicating with a Service Centralization and Continuity (SCC) application server.

25. The apparatus of claim 18, wherein the transceiver is further for communicating a change in the at least one media operation of the collaborative session by using an Extensible Markup Language (XML) message.

26. The apparatus of claim 25, wherein the transceiver is further for communicating the change using the XML message to transfer control of the collaborative session to the second UE.

27. The apparatus of claim 25, wherein the transceiver is further for using a Multipurpose Internet Mail Extensions (MIME) type defined for simple media transfer in the collaborative session.

28. The apparatus of claim 25, wherein the transceiver is further for using the XML message contained in at least one of the SIP messages.

29. The apparatus of claim 18, wherein the transceiver is further for communicating a change in the at least one media operation using signaling contained in a SIP header of a REFER message.

30. The apparatus of claim 18, wherein the transceiver is further for communicating an inter-UE transfer media operation using signaling contained in a Session Description Protocol (SDP) representation either in a SIP message body or in a SIP message header.

31. The apparatus of claim 18, wherein the computing platform is further for tracking a media direction attribute.

32. The apparatus of claim 18, wherein the computing platform is further for indicating that a bi-directional media component comprises a plurality of unidirectional media components respectively terminated at different UEs.

33. A method for an inter-user equipment (UE) transfer in a collaborative session, comprising:
remotely facilitating, across a network, the collaborative session of a first UE and a second UE with a remote end;
communicating with the first UE, the second UE, and the remote end using a Session Initiation Protocol (SIP) and an enhanced SIP;
relaying signaling from the first UE to the second UE for controlling the inter-UE transfer to transfer at least one media operation of the collaborative session to the second UE;
receiving an indication from the first UE of whether functionality as a controller in the inter-UE transfer is supported; and
sending SIP messages to the second UE to initiate the inter-UE transfer, wherein at least one of the SIP messages comprises the indication in a SIP media feature tag.

34. The method of claim 33, further comprising transmitting an indication to one of the first UE or the second UE to act in a role of the controller or a controllee within the collaborative session.

35. The method of claim 33, wherein receiving the indication whether one of the first UE or the second UE supports functionality as the controller in the inter-UE transfer further comprises using one of a SIP header, and a content body within at least one of the SIP messages.

36. The method of claim 34, wherein transmitting the indication to the one of the first UE or the second UE to act in the role of the controller or the controllee within the collaborative session further comprises detecting a selected one of a group of mechanisms including the SIP media feature tag, a SIP header, and a content body within at least one of the SIP messages.

37. The method of claim 33, further comprising indicating information in a transfer request comprising a transfer operation to be performed, a media component type and a media component identification of the at least one media operation, and a source and target device of the transfer operation.

38. The method of claim 33, further comprising determining a change in the at least one media operation of the collaborative session by determining a selected one of a group including adding, deleting, and modifying characteristics of a media stream, transferring a media session, retrieving back a media session, mixing media streams, and duplicating media streams.

39. The method of claim 33, wherein facilitating the collaborative session comprises using a Service Centralization and Continuity (SCC) application server.

40. The method of claim 33, further comprising communicating a change in the at least one media operation of the collaborative session by using an Extensible Markup Language (XML) message.

41. The method of claim 40, wherein communicating the change using the XML message further comprises transferring control of the collaborative session to the second UE.

42. The method of claim 40, further comprising using a Multipurpose Internet Mail Extensions (MIME) type defined for simple media transfer in the collaborative session.

43. The method of claim 40, further comprising using the XML message contained in at least one of the SIP messages.

44. The method of claim 33, further comprising communicating a change in the at least one media operation using signaling contained in a SIP header of a REFER message.

45. The method of claim 33, further comprising communicating an inter-UE transfer media operation using signaling contained in a Session Description Protocol (SDP) representation either in a SIP message body or in a SIP message header.

46. The method of claim 33, further comprising tracking a media direction attribute.

47. The method of claim 33, further comprising indicating that a bi-directional media component comprises a plurality of unidirectional media components respectively terminated at different UEs.

48. At least one processor for an inter-user equipment (UE) transfer in a collaborative session, comprising:
a first processor module for remotely facilitating across a network, the collaborative session of a first UE and a second UE with a remote end;
a second processor module for communicating with the first UE, the second UE, and the remote end using a Session Initiation Protocol (SIP) and an enhanced SIP;
a third processor module, comprising hardware, for relaying signaling from the first UE to the second UE for controlling the inter-UE transfer to transfer at least one media operation of the collaborative session to the second UE;
a fourth processor module for receiving an indication from the first UE of whether functionality as a controller in the inter-UE transfer is supported; and
a fifth processor module for sending SIP messages to the second UE to initiate the inter-UE transfer, wherein at least one of the SIP messages comprises the indication in a SIP media feature tag.

49. A non-transitory computer-readable storage medium computer executable codes for an inter-user equipment (UE) transfer in a collaborative session, the codes comprising:
a first set of codes for causing a computer to remotely facilitate across a network, the collaborative session of a first UE and a second UE with a remote end;
a second set of codes for causing the computer to communicate with the first UE, the second UE, and the remote end using a Session Initiation Protocol (SIP) and an enhanced SIP;
a third set of codes for causing the computer to relay signaling from the first UE to the second UE for controlling the inter-UE transfer to transfer at least one media operation of the collaborative session to the second UE;
a fourth set of codes for causing the computer to receive an indication from the first UE of whether functionality as a controller in the inter-UE transfer is supported; and
a fifth set of codes for causing the computer to send SIP messages to the second UE to initiate the inter-UE transfer, wherein at least one of the SIP messages comprises the indication in a SIP media feature tag.

50. An apparatus for an inter-user equipment (UE) transfer in a collaborative session, comprising:
a network interface for:
remotely facilitating, across a network, the collaborative session of a first UE and a second UE with a remote end;
communicating with the first UE, the second UE, and the remote end using a Session Initiation Protocol (SIP) and an enhanced SIP; and
relaying signaling from the first UE to the second UE for controlling the inter-UE transfer to transfer at least one media operation of the collaborative session to the second UE; and
a computing platform for receiving, via the network interface, an indication from the first UE of whether functionality as a controller in the inter-UE transfer is supported,
wherein the network interface is further for sending SIP messages to the second UE to initiate the inter-UE transfer, wherein at least one of the SIP messages comprises the indication in a SIP media feature tag.

51. The apparatus of claim 50, wherein the network interface is further for transmitting an indication to one of the first UE or the second UE to act in a role of the controller or a controllee within the collaborative session.

52. The apparatus of claim 50, wherein the network interface is further for receiving the indication whether one of the first UE or the second UE supports functionality as the controller in the inter-UE transfer by using one of a SIP header, and a content body within at least one of the SIP messages.

53. The apparatus of claim 51, wherein the network interface is further for transmitting the indication to one of the first UE or the second UE to act in the role of the controller or the controllee within the collaborative session by detecting a selected one of a group of mechanisms including the SIP media feature tag, a SIP header, and a content body within at least one of the SIP messages.

54. The apparatus of claim 50, wherein the network interface is further for indicating information in a transfer request comprising a transfer operation to be performed, a media component type and a media component identification of the at least one media operation, and a source and target device of the transfer operation.

55. The apparatus of claim 50, wherein the computing platform is further for determining a change in the at least one media operation of the collaborative session by determining a selected one of a group including adding, deleting, and modifying characteristics of a media stream, transferring a media session, retrieving back a media session, mixing media streams, and duplicating media streams.

56. The apparatus of claim 50, further comprising a Service Centralization and Continuity (SCC) application server for facilitating the collaborative session.

57. The apparatus of claim 50, wherein the network interface is further for communicating a change in the at least one media operation of the collaborative session by using an Extensible Markup Language (XML) message.

58. The apparatus of claim 57, wherein the network interface is further for communicating the change using the XML message to transfer control of the collaborative session to the second user equipment.

59. The apparatus of claim 57, wherein the network interface is further for using a Multipurpose Internet Mail Extensions (MIME) type defined for simple media transfer in the collaborative session.

60. The apparatus of claim 57, wherein the network interface is further for using the XML message contained in at least one of the SIP messages.

61. The apparatus of claim 50, wherein the network interface is further for communicating a change in the at least one media operation using signaling contained in a SIP header of a REFER message.

62. The apparatus of claim 50, wherein the network interface is further for communicating an inter-UE transfer media operation using signaling contained in a Session Description Protocol (SDP) representation either in a SIP message body or in a SIP message header.

63. The apparatus of claim 50, wherein the computing platform is further for tracking a media direction attribute.

64. The apparatus of claim 50, wherein the computing platform is further for indicating that a bi-directional media component comprises a plurality of unidirectional media components respectively terminated at different UEs.

* * * * *